(12) United States Patent
Bartlett et al.

(10) Patent No.: US 7,972,004 B2
(45) Date of Patent: Jul. 5, 2011

(54) SYSTEM AND METHOD FOR UNIFORM LIGHT GENERATION

(75) Inventors: Terry Alan Bartlett, Dallas, TX (US); Paul L. Rancuret, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 528 days.

(21) Appl. No.: 12/106,114

(22) Filed: Apr. 18, 2008

(65) Prior Publication Data

US 2009/0262307 A1 Oct. 22, 2009

(51) Int. Cl.
*G03B 21/14* (2006.01)

(52) U.S. Cl. ............... 353/20; 353/31; 353/99; 353/77; 353/78; 353/84; 353/98; 353/122; 359/232; 359/558; 359/559; 359/560; 359/561; 359/562; 359/563; 359/564; 359/565; 359/566; 359/567; 359/568; 359/569; 359/570; 359/571; 359/572; 359/573; 359/574; 359/575; 359/576; 359/577; 359/578; 359/579; 359/580; 359/581; 359/582; 359/583; 359/584; 359/585; 359/586; 359/587; 359/588; 359/589; 359/590; 359/599; 348/758; 348/750; 348/753; 348/756; 372/29.01

(58) Field of Classification Search ............... 353/31, 353/37, 84, 99, 122; 359/227, 232, 599, 359/619, 891, 892, 558–576, 577–590; 348/758, 348/750, 753, 756; 372/29.01
See application file for complete search history.

(56) References Cited

U.S. PATENT DOCUMENTS

| | | | |
|---|---|---|---|
| 5,845,981 A | 12/1998 | Bradley | |
| 5,990,983 A * | 11/1999 | Hargis et al. | 348/758 |
| 6,175,440 B1 * | 1/2001 | Conemac | 359/204.1 |
| 6,351,324 B1 * | 2/2002 | Flint | 359/202.1 |
| 6,540,362 B1 | 4/2003 | Janssen | |
| 6,577,429 B1 * | 6/2003 | Kurtz et al. | 359/279 |
| 6,580,560 B1 * | 6/2003 | Benner, Jr. | 359/599 |
| 6,594,090 B2 * | 7/2003 | Kruschwitz et al. | 359/707 |
| 6,606,173 B2 * | 8/2003 | Kappel et al. | 359/15 |
| 6,698,894 B2 | 3/2004 | Anderson | |
| 6,747,781 B2 * | 6/2004 | Trisnadi | 359/279 |
| 6,824,270 B2 | 11/2004 | Kim et al. | |
| 6,831,789 B2 | 12/2004 | Chang | |
| 6,921,171 B2 | 7/2005 | Lee et al. | |
| 7,048,381 B2 | 5/2006 | Kim et al. | |
| 7,090,359 B2 | 8/2006 | Kim et al. | |
| 7,142,257 B2 * | 11/2006 | Callison et al. | 348/744 |

(Continued)

*Primary Examiner* — Georgia Y Epps
*Assistant Examiner* — Sultan Chowdhury
(74) *Attorney, Agent, or Firm* — Charles A. Brill; Wade James Brady, III; Frederick J. Telecky, Jr.

(57) ABSTRACT

A system and method for uniform light generation in projection display systems. An illumination source comprises a light source to produce colored light, and a scrolling optics unit optically coupled to the light source, the scrolling optics unit configured to create lines of colored light from the colored light, and to scroll the lines of colored light along a direction orthogonal to a light path of the illumination source. The scrolling optics unit comprises a single light shaping diffuser to transform the colored light into the lines of colored light, an optical filter positioned in the light path after the light shaping diffuser, and a scrolling optics element positioned in the light path after the optical filter. The single light shaping diffuser is capable of simultaneously transforming colored light into lines of colored light having substantially uniform intensity to provide uniform illumination.

23 Claims, 6 Drawing Sheets

U.S. PATENT DOCUMENTS

| | | |
|---|---|---|
| 7,147,332 B2 | 12/2006 | Conner |
| 7,370,972 B2 * | 5/2008 | Morikawa et al. ............... 353/20 |
| 7,554,737 B2 * | 6/2009 | Knox et al. ................... 359/599 |
| 2002/0075460 A1 * | 6/2002 | Kappel et al. ................. 353/102 |
| 2005/0285027 A1 * | 12/2005 | Favalora et al. .............. 250/234 |
| 2010/0215794 A1 * | 8/2010 | Lin et al. ....................... 425/470 |

* cited by examiner

SYSTEM AND METHOD FOR UNIFORM LIGHT GENERATION

CROSS-REFERENCE TO RELATED APPLICATIONS

This application is related to the following co-assigned patent applications: Ser. No. 11/949,624, filed Dec. 3, 2007, entitled "System and Method for Dynamic Display System Illumination," Ser. No. 11/693,343, filed Mar. 29, 2007, entitled "Optical System for a Thin, Low-Chin, Projection Television," Ser. No. 11/848,022, filed Aug. 30, 2007, entitled "System and Method for Display Illumination," and Ser. No. 11/959,277, filed Dec. 18, 2007, entitled "Optical System for a Thin, Low-Chin, Projection Television," which applications are hereby incorporated herein by reference.

TECHNICAL FIELD

The present invention relates generally to a system and method for displaying images, and more particularly to a system and method for uniform light generation in projection display systems.

BACKGROUND

In a microdisplay-based projection display system, light from a light source may be modulated by the microdisplay as the light reflects off the surface of the microdisplay or passes through the microdisplay. Examples of commonly used microdisplays may include digital micromirror devices (DMD), deformable micromirror devices, transmissive, reflective, or transflective liquid crystal, liquid crystal on silicon, ferroelectric liquid crystal on silicon, and so forth. In a digital micromirror device (DMD)-based projection system, where large numbers of positional micromirrors may change state (position) depending on an image being displayed, light from the light source may be reflected onto or away from a display plane.

For image quality reasons, it may be desirous to maximize the brightness of the images being displayed. In general, the brighter the images, the better the perceived image quality. Therefore, there have been many techniques utilized to help improve image brightness. Some of the techniques may include increasing the brightness of the light source, using multiple light sources, and so forth.

In a laser illuminated, microdisplay-based projection display system, it may be possible to maximize image brightness by increasing the duty cycle of the laser(s) used to illuminate the microdisplay. Scanning the light produced by the laser(s) so that more than one color of light may simultaneously illuminate the microdisplay may be performed to increase the duty cycle of the laser(s). That is, if only one color of light may illuminate the entire microdisplay at a time, then all of the other lasers must be turned off. However, if scanning permits the light from a first laser and the light from a second laser to illuminate different portions of the microdisplay, then the on-time of the first and the second lasers may be increased, thereby increasing the duty cycle of the lasers.

However, the light, produced by the laser(s), should be uniform or relatively uniform to produce a uniformly illuminated image on the display plane when scanned. If the light is not sufficiently uniform, variations in illumination may be seen in the image. Furthermore, if multiple colored lights are used, then the multiple colors of lights should have substantially identical intensity profiles to prevent the appearance of color bands in the image on the display plane.

SUMMARY OF THE INVENTION

These and other problems are generally solved or circumvented, and technical advantages are generally achieved, by embodiments of a system and method for uniform light generation in projection display systems.

In accordance with an embodiment, an illumination source is provided. The illumination source includes a light source to produce colored light, and a scrolling optics unit optically coupled to the light source. The scrolling optics unit creates lines of colored light from the colored light, and scrolls the lines of colored light along a direction orthogonal to a light path of the illumination source. The scrolling optics unit includes a single light shaping diffuser to transform the colored light into the lines of colored light, an optical filter positioned in the light path after the light shaping diffuser, and a scrolling optics element positioned in the light path after the optical filter. The optical filter shapes the lines of colored light, and the scrolling optics element moves the lines of colored light in the direction orthogonal to the light path.

In accordance with another embodiment, a method is provided. The method includes generating spots of colored light, focusing the spots of colored light on a single diffuser, and generating lines of colored light from the spots of colored light. The method also includes filtering the lines of colored light, and scrolling the filtered lines of colored light.

In accordance with another embodiment, a method of manufacturing a display system is provided. The method includes installing a light source that generates coherent light, installing a microdisplay in a light path of the display system after the light source, installing a controller that controls the light source, a scrolling optics element, and a microdisplay, and installing a display plane in the light path of the display system after the microdisplay. The light source installing includes installing a coherent light source to produce colored light, installing a light shaping diffuser in a light path of the coherent light source, installing a filter in the light path of the coherent light source, and installing the scrolling optics element in the light path of the coherent light source after the filter. The light shaping diffuser substantially simultaneously transforms the colored light into lines of colored light, the filter shapes the lines of colored light, and the scrolling optics element scrolls the lines of colored light.

An advantage of an embodiment is that a single light diffuser may be used for multiple colors of light. This may result in a high degree of uniformity between the different colors of light. Therefore, images created from the multiple colors of light may have uniform illumination without the appearance of color bands.

A further advantage of an embodiment is that the use of a single light diffuser in an illumination system may result in a simpler and less expensive illumination system when compared to a similar illumination system using multiple light diffusers.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a laser illuminated, microdisplay-based projection display system, wherein the microdisplay is a DMD. The invention may also be applied, however, to other laser illuminated, microdisplay-based projection display systems, such as projection display systems utilizing deformable micromirror devices, transmissive, reflective, or transflective liquid crystal displays, liquid crystal on silicon displays, ferroelectric liquid crystal on silicon displays, and so forth.

Figure 1A:
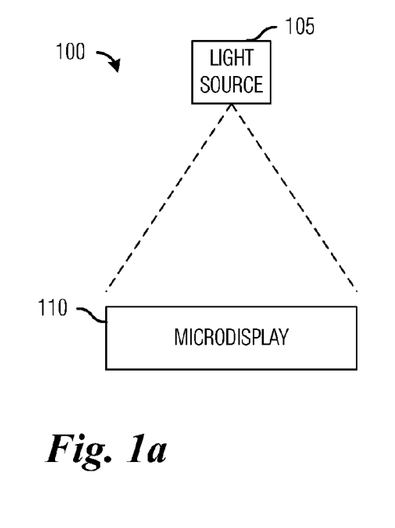
FIG. 1a is a diagram of a portion of a microdisplay-based projection display system.
Figure 1B:
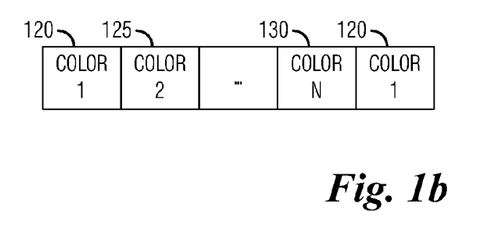
FIG. 1b is a diagram of light output from a light source operating in sequential color mode.

FIG. 1a illustrates a portion of a microdisplay-based projection display system 100. The microdisplay-based projection display system 100 includes a light source 105 and a microdisplay 110. The light source 105 may be used to provide light that illuminates the microdisplay 110. The light source 105 may produce light one color at a time. FIG. 1b illustrates a time-space diagram of a sequence of colored light with N unique colors. For example, the light source 105 may produce color number 1 (block 120), which may be followed by color number 2 (block 125), which may be followed by the remaining N-2 colors, until the light source 105 may produce color number N (block 130). After producing color number N (block 130), the light source 105 may repeat the color sequence and produce color number 1 (block 120), etc.

Although shown in FIG. 1a as each laser having equal duty cycle, the lasers of the light source may have different duty cycles. For example, in a three laser light source, a first laser may have a ⅓ duty cycle and the second laser and the third may have a ⅔ duty cycle. The duty cycle of each laser may depend on factors such as perceived color brightness, desired color point, laser power, and so forth. In light sources where certain colors may be produced by combining light from several lasers, the duty cycle of each laser may also differ. For example, in a RGBCYMW light source, there may be three separate lasers R, G, and B, while the colors C, Y, and M may be produced by combining light from two of the three lasers, and the color W may be produced by combining light from all three lasers.

Figure 2A:
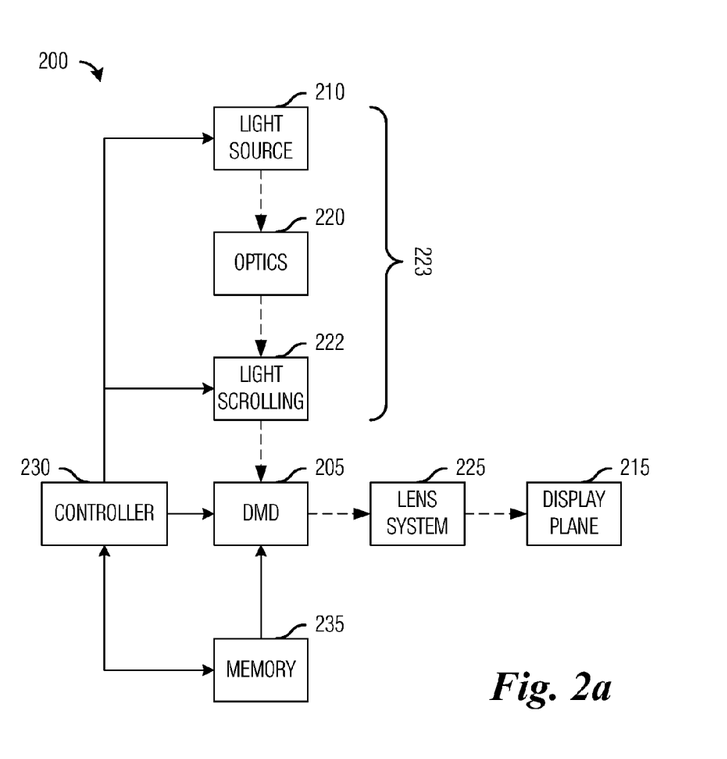
FIG. 2a is a diagram of a DMD-based projection display system.

FIG. 2a illustrates an exemplary laser illuminated DMD-based projection display system 200. The DMD-based projection display system 200 includes a DMD 205 that modulates light produced by a light source 210. The light source 210 may make use of multiple lasers to produce the desired colors of light. For example, the light source 210 may include three lasers, a red (R) laser, a green (G) laser, and a blue (B) laser. By turning on individual lasers and/or multiple lasers, the light source 210 may produce multiple color combinations, such as a three-color RGB color combination, a seven-color RGBCYMK color combination, and so forth. Although the discussion focuses on solid-state lasers, other sources of coherent light, including filtered non-coherent light, free-electron lasers, and so forth, may be used in place of the solid-state lasers. Therefore, the discussion should not be construed as being limited to the present embodiments.

The DMD 205 is an example of a microdisplay or an array of light modulators. Other examples of microdisplays may include transmissive or reflective liquid crystal, liquid crystal on silicon, ferroelectric liquid-crystal-on-silicon, deformable micromirrors, and so forth. In a microdisplay, a number of light modulators may be arranged in a rectangular, square, diamond shaped, and so forth, array. Each light modulator in the microdisplay may operate in conjunction with the other light modulators in the microdisplay to modulate the light produced by the light source 210. The light modulated by the DMD 205 may be used to create images on a display plane 215. The DMD-based projection display system 200 also includes an optics system 220, which may be used to collimate and/or focus the light produced by the light source 210 as well as to reject stray light. The optics system 220 may also be used to create lines of colored light from spots of colored light produced by the light source 210. The DMD-based projection display system 200 may also include a lens system 225, which may be used to manipulate (for example, focus) the light reflecting off the DMD 205.

Also included in an optical path of the DMD-based projection display system 200 may be a light scrolling unit 222. The light scrolling unit 222 may be used to scroll or scan light from the light source 210 onto different portions of the DMD 205 and away from other portions of the DMD 205. This may allow for the simultaneous illumination of the DMD 205 by light of different colors. For example, a red colored light may illuminate a top third of the DMD 205, while a green colored light may illuminate a middle third of the DMD 205, and a blue colored light may illuminate a bottom third of the DMD 205. This may enable a higher duty cycle for the lasers used in the light source 210, thereby increasing the brightness of the images produced by the DMD-based projection display system 200. Collectively, the light source 210, the optics system 220, and the light scrolling unit 222 may be referred to as an illumination system 223 of the DMD-based projection display system 200, with the optics system 220 and the light scrolling unit 222 forming a scrolling optics unit.

The DMD 205 may be coupled to a controller 230, which may be responsible for loading image data into the DMD 205, controlling the operation of the DMD 205, providing micromirror control commands to the DMD 205, controlling the light produced by the light source 210, and so forth. A memory 235, which may be coupled to the DMD 205 and the controller 230, may be used to store the image data, as well as configuration data, color correction data, and so forth.

Figure 2B:
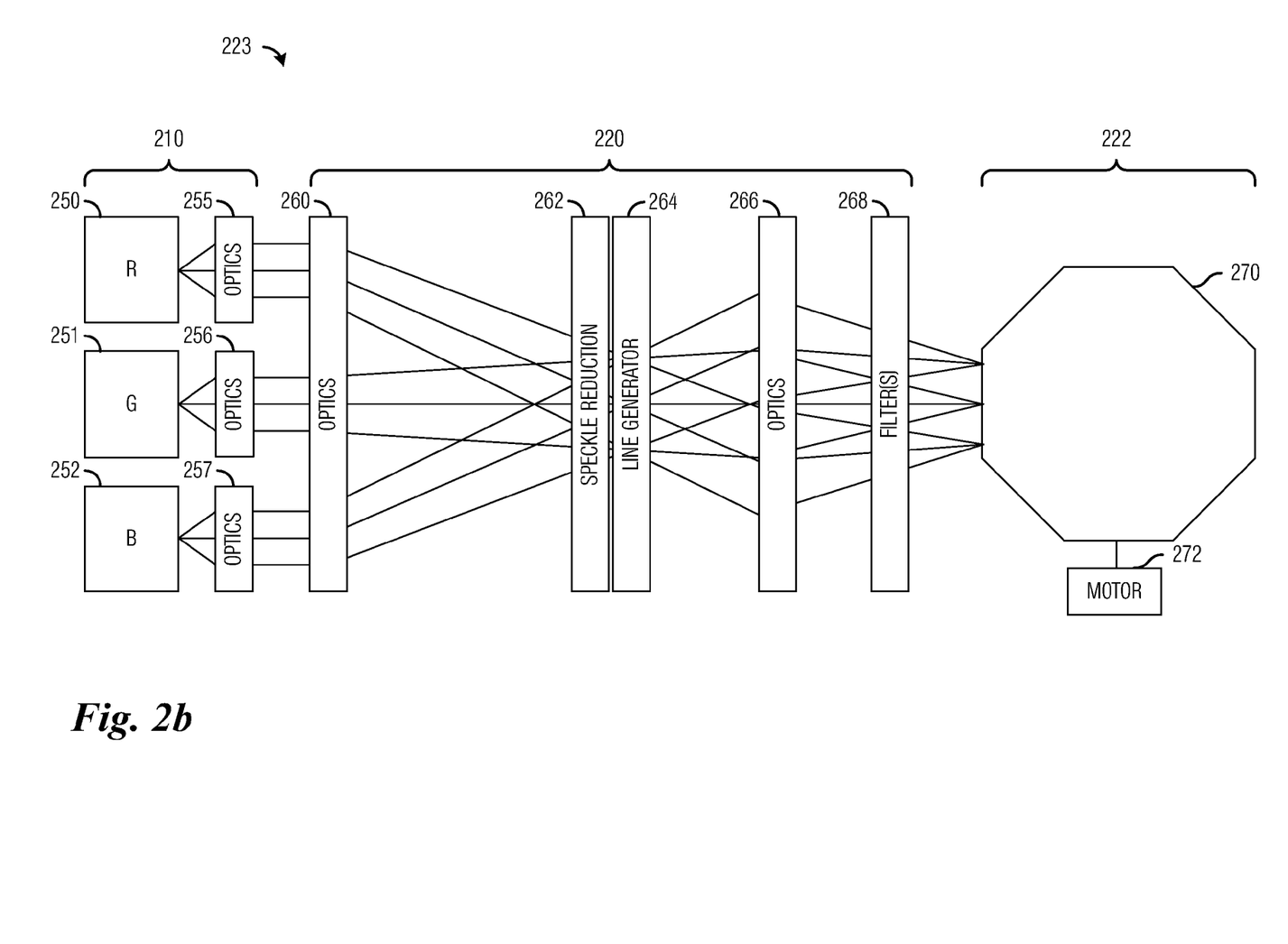
FIG. 2b is a diagram of an illumination system.

FIG. 2*b* illustrates a detailed view of the illumination system 223. The illumination system 223 includes the light source 210, the optics system 220, and the light scrolling unit 222. The light source 210 includes multiple laser light sources, such as a red laser 250, a green laser 251, and a blue laser 252. Each of the laser light sources may have a first optical element(s) positioned at a light output of the laser light source to provide light processing such as filtering, focusing, and so forth. Additionally, the first optical element(s) may collimate the light from the laser light sources. An optical fiber may be used to couple the laser to the first optical element. For example, optical element 255 may be at the output of the red laser 250, optical element 256 may be at the output of the green laser 251, and optical element 257 may be at the output of the blue laser 252. Although the discussion focuses on the light source 210 having three primary color lasers, the embodiments may be applicable to light sources having a different number of lasers as well as different colors. Therefore, the discussion of the light source 210 having three primary colors should not be construed as being limiting to either the scope or the spirit of the embodiments.

The optics systems 220 includes multiple optical elements that may be used to optically process light produced by the light source 210 into a form that may be modulated by the DMD 205 to create images on the display plane 215. The optics system 220 may include a second optics element(s) 260 that may focus collimated light from the light source 210 onto a speckle reduction element 262. Furthermore, if the light source 210 does not produce collimated light, the second optics element(s) 260 may include a light collimator optical element.

When scattered by a rough surface, such as a display plane, a wall, or so forth, the coherent light produced by a laser light source may produce a modulating spatial noise having high contrast. The modulating spatial noise, commonly referred to as speckle, may be highly objectionable to viewers. Light fields from each of the individual scatterers on the surface of the display plane, wall, or so on, may add coherently and sum as phasors resulting in a randomly varying intensity across the display plane, wall, or so on. The speckle reduction element 262, such as a spinning 0.5 degree diffuser, may help to reduce speckle. Techniques in speckle reduction are considered to be well understood by those of ordinary skill in the art of the embodiments and will not be discussed further herein.

The optics system 220 also includes a line generator 264. The line generator 264 may be used to convert spots of colored light as produced by the light source 210 into lines of colored light. The line generator 264 may be implemented as a single light shaping diffuser. The light shaping diffuser may shape light refractively or reflectively. The line generator 264 may shape the far-field light distribution of a collimated laser beam from a spot to a line. The line generator 264 may be located in a pupil plane of the DMD-based projection display system 200 and may displace spots of colored light in angle through a pupil so that the light shaping diffuser may generate lines of colored light from the spots of colored light. For example, if the spots of colored light are displaced in an object plane, then the resulting lines of colored light may be separated in an image plane, with a shape of the lines of colored light being determined by the line generator 264.

Figure 2C:
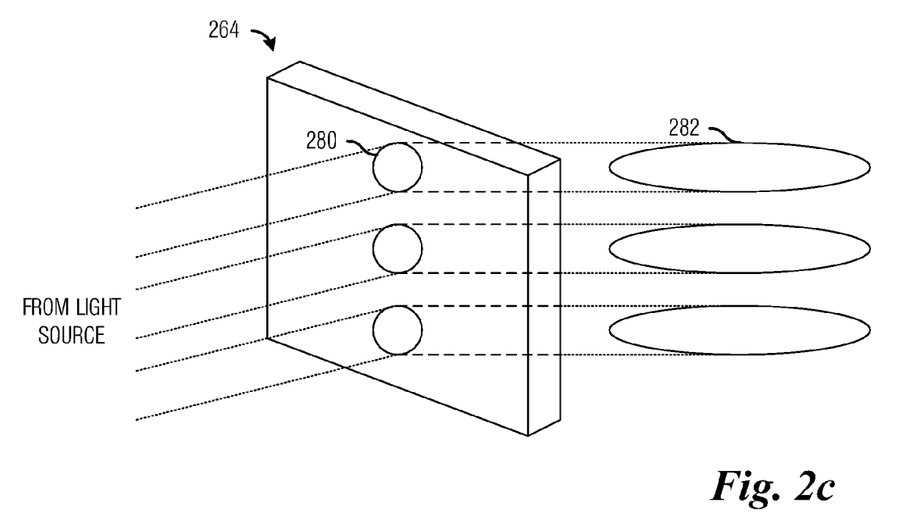
FIG. 2c is a diagram of a line generator.

FIG. 2*c* illustrates a view of the line generator 264. The line generator 264 may be implemented as a single light shaping diffuser. Laser light from the light source 210 may strike a surface of the line generator 264 at different portions of the surface. As the laser light from the light source 210 arrives at the line generator 264, it may have the shape of a spot of light, such as spot 280, and it may have been collimated by the first optical element(s), such as optical elements 255-257. As the laser light passes through the line generator 264, the spot 280 may be reshaped into a line, such as line 282. As illustrated in FIG. 2*c*, the line generator 264 converts three spots of light into three lines of light. The use of three spots of light from the light source 210 is for illustrative purposes only, and the line generator 264 may be capable of converting a number of spots of light into corresponding lines of light. Therefore, the discussion of three spots of light should not be construed as being limiting to either the scope or the spirit of the embodiments.

When multiple collimated beams of laser light pass through generally the same area of the line generator 264, implemented as a single light shaping diffuser, optical variations may be significantly reduced from those of a system using multiple light shaping diffusers. The use of the single light shaping diffuser reshapes the multiple colored light spots produced by the light source 210 into colored light lines, with each colored light line having substantially the same intensity profile and illumination distribution. This may lead to images being produced without undesirable color stripes and so forth.

Turning back now to FIG. 2*b*, after the light from the light source 210 has been reshaped from spots of light into lines of light by the line generator 264, the lines of light may receive further optical processing by a third optical element(s) 266. The third optical element(s) 266 may be used to focus, filter, and so forth, the lines of light from the line generator 264.

The optics system 220 may also include an optical filter 268. The optical filter 268 may be used to help prevent stray light from the line generator 264 from passing through and unintentionally illuminating the DMD 205 and consequently the display plane 215. The optical filter 268 may be implemented as an optically opaque plate with slit apertures, with one slit aperture per line of light. For example, the optical filter 268 may have three slit apertures for light sources, such as the light source 210, that are capable of producing three lines of light.

Furthermore, the optical filter 268 may include color filters, such as dichroic color filters, that may be used to help prevent stray light from a first line of light from contaminating a second line of light. In general, the color filters may be used to help ensure that light having desired color characteristics (i.e., light having desired wavelengths) may pass through the optical filter 268. In addition to dichroic color filters, volume holographic optical elements may also be used as color filters. Bragg planes, which generally are planes of alternating high and low-index dielectric material within a volume hologram, may be designed to reflect or transmit a light having a narrow band of wavelengths. Furthermore, absorptive color filters may also be used. For example, a slit aperture intended to shape a red colored line of light may include a red colored filter that may permit only light having wavelengths in a desired red portion of the light spectrum to pass. If, prior to passing through the optical filter 268, the red colored line of light includes light of other wavelengths, then the red colored filter in the optical filter 268 may prevent the light of other wavelengths from passing and pass only the red wavelengths of light.

After optical processing by the optical filter 268, the lines of light may be scrolled over the surface of the DMD 205 by the light scrolling unit 222. The light scrolling unit 222 includes a scrolling optics element 270, such as a reflective or refractive rotating polygon or a flower wheel. A reflective or refractive rotating polygon may be described as a multi-faceted rotating body having lens elements and/or mirrors arranged about its circumference, while a flower wheel may be described as a rotating disk having a set of optics elements arranged along a circumference around a center of the rotating disk. The scrolling optics element 270 may be used to scroll the lines of light produced by the line generator 264 over the surface of the DMD 205. The scrolling optics element 270 may be rotated by a motor 272 coupled to the scrolling optics element 270. The scrolling optics element 270 may be rotated about an axis with the axis orthogonal to a light path of the lines of light in the case of reflective or refractive rotating polygons or parallel to the light path of the lines of light in the case of the flower wheel.

Figure 2D:
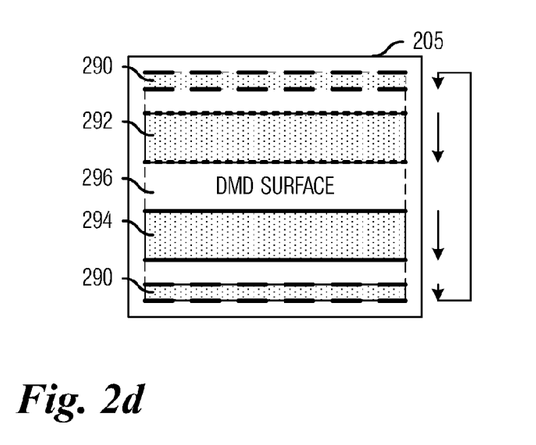
FIG. 2d is a diagram of a top view of a DMD illuminated by lines of light.

FIG. 2d illustrates a top view of the DMD 205. Shown in the surface of the DMD 205 are several lines of differently colored light, for example, a red colored light (shown as dashed light line 290) may illuminate a top portion of the surface of the DMD 205, while a green colored light (shown as dotted light line 292) may illuminate a middle portion of the surface of the DMD 205, and a blue colored light (shown as solid light line 294) may illuminate a bottom-middle portion of the surface of the DMD 205. Furthermore, a bottom portion of the surface of the DMD 205 is illuminated by a part of the dashed light line 290, representing the red colored light. As the red colored light moves off the bottom portion of the surface of the DMD 205, it reappears at the top portion of the surface of the DMD 205. Alternatively, a color may completely move off the bottom portion of the DMD 205 before reappearing at the top portion of the DMD 205.

The lines of light as created by the illumination system 223 preferably occupy a portion of the surface of the DMD 205 that is less than a reciprocal of the number of lines of light. For example, if there are three lines of light illuminating the surface of the DMD 205, then each line of light preferably has a thickness of less than one third of the surface of the DMD 205. Therefore, there may be portions of the surface of the DMD 205 that are unilluminated between the lines of light. For example, a portion 296 of the surface of the DMD 205 is unilluminated by light from the light source 210. The unilluminated portions of the surface of the DMD 205 may allow for the loading of image data into the light modulators of the DMD 205.

Figure 3A:
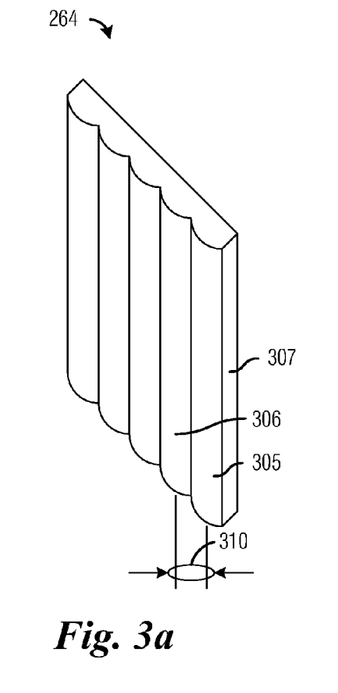
FIG. 3a is a diagram of a light shaping diffuser.

FIG. 3a illustrates a view of the light shaping diffuser 264. The light shaping diffuser 264 may reshape spots of light into lines of light by having a periodic array of lenticular structures, such as lenticular structures 305 and 306, on a body 307 of the light shaping diffuser 264. The lenticular structures 305 and 306 should have a pitch (shown as highlight 310) that is substantially greater than a longest wavelength of light expected to pass through the light shaping diffuser 264. The pitch being substantially greater than the longest wavelength of light may ensure that the light spreading is due primarily to refraction rather than diffraction. This may help to minimize uniformity differences between light of different wavelengths. Additionally, the lenticular structures 305 and 306 may preferably be oriented so that they are orthogonal to an intended orientation of the lines of light created by the light shaping diffuser 264. For example, the vertical orientation of the lenticular structures 305 and 306 may produce lines of light having a horizontal orientation.

The lenticular structures, such as the lenticular structures 305 and 306, of the light shaping diffuser 264 may be arranged on a single surface of the light shaping diffuser 264, wherein the single surface may either be a surface wherein the spots of light enter the light shaping diffuser 264 or a surface wherein the lines of light exit the light shaping diffuser 264. Alternatively, they may be arranged on both the light entering and exiting surfaces of the light shaping diffuser 264.

The light shaping diffuser 264 (the body 307 and/or the lenticular structures) may be formed from a transparent or substantially transparent material, such as glass, plastic, polymethylmethacrylate (PMMA), polycarbonate, polyester, mylar, acrylic, polymethyl-pentene, and so forth. The light shaping diffuser 264 may be created by machining. Alternatively, the light shaping diffuser 264 may formed in a single molding step or the lenticular structures may be molded separately and then attached to each other and to the body 307 of the light shaping diffuser 264 using an adhesive, glue, heat, sound waves, or so on. Generally, care should be taken to ensure that significant light loss at an interface between the lenticular structures 305 and 306 and the body 307 is prevented.

Figure 3B:
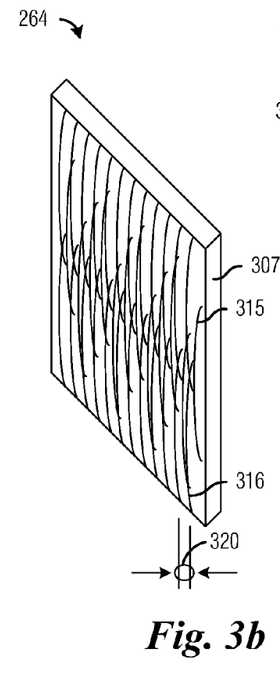
FIG. 3b is a diagram of a light shaping diffuser.

FIG. 3b illustrates a view of the light shaping diffuser 264. The light shaping diffuser 264 may reshape spots of light into lines of light by having a random or pseudorandom arrangement of structures, such as structures 315 and 316, on the body of the light shaping diffuser 264. The structures 315 and 316 should have a feature size (shown as highlight 320) that is substantially greater than a longest wavelength of light expected to pass through the light shaping diffuser 264. Again, the feature size being substantially greater than the longest wavelength of light may ensure that the light spreading is due primarily to refraction rather than diffraction. This may help to minimize uniformity differences between light of different wavelengths. Furthermore, the structures 315 and 316 may preferably be oriented so that they are generally orthogonal to an intended orientation of the lines of light created by the light shaping diffuser 264. For example, the vertical orientation of the structures 315 and 316 shown in FIG. 3b may produce lines of light having a horizontal orientation.

The structures, such as the structures 315 and 316, of the light shaping diffuser 264 may be arranged on a single surface of the light shaping diffuser 264, wherein the single surface may either be a surface wherein the spots of light enter the light shaping diffuser 264 or a surface wherein the lines of light exit the light shaping diffuser 264. Alternatively, they may be arranged on both the light entering and exiting surfaces of the light shaping diffuser 264. The structures may be created by using a relief mold containing positives or negatives of the structures to form the light shaping diffuser 264, for example.

Figure 3C:
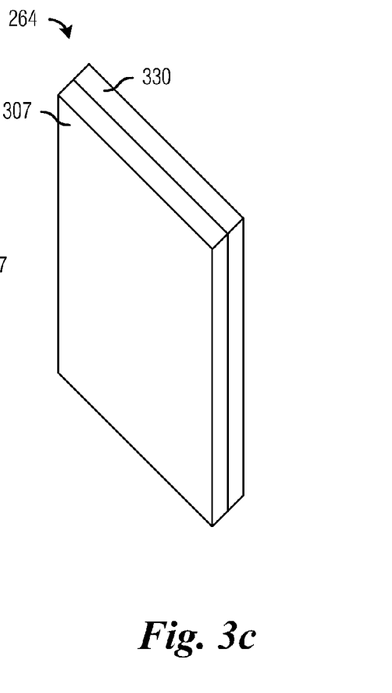
FIG. 3c is a diagram of a reflective light shaping diffuser.

FIG. 3c illustrates a simplified view of the light shaping diffuser 264, wherein the light shaping diffuser 264 operates reflectively. The diagram is simplified with structures, such as the lenticular structures 305 and the structures 315, omitted to maintain simplicity. The light shaping diffuser 264 includes the body 307 and a reflective coating 330 applied to a surface of the body 307. The reflective coating 330 is shown in FIG. 3c as being about as thick as the body 307. This is only for illustrative purposes only, to simplify the illustration of the reflective coating 330; typically, the reflective coating 330 is thinner than the body 307.

Light, such as beams of collimated laser light, each of which may exhibit the shape of a circular spot in the far field sufficiently far from the laser source, may enter the light shaping diffuser 264 on a surface of the body 307 opposite the reflective coating 330. After passing through the body 307, the collimated laser light reflects off the reflective coating 330 and once again passes through the body 307. The collimated laser light then exits the light shaping diffuser 264 in the form of lines of light.

Figure 3D:
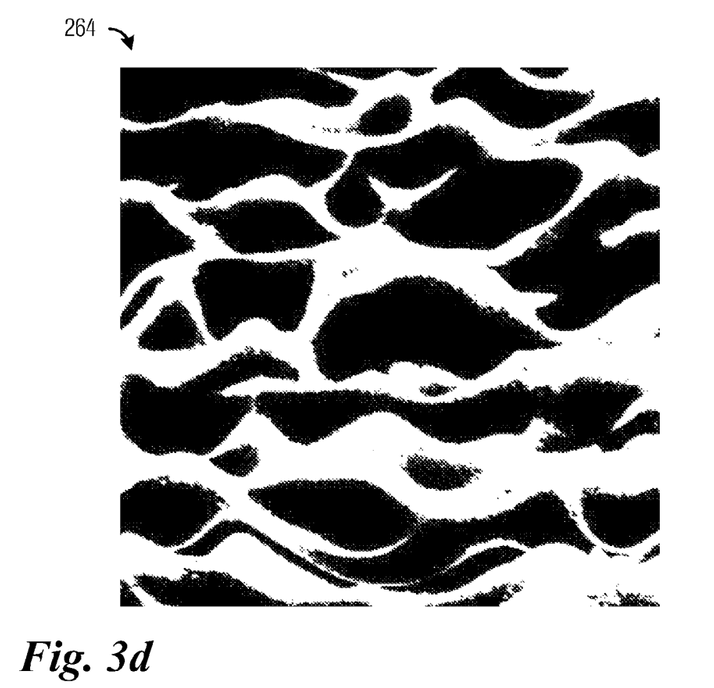
FIGS. 3d and 3e are diagrams of surfaces of light shaping diffusers.
Figure 3E:
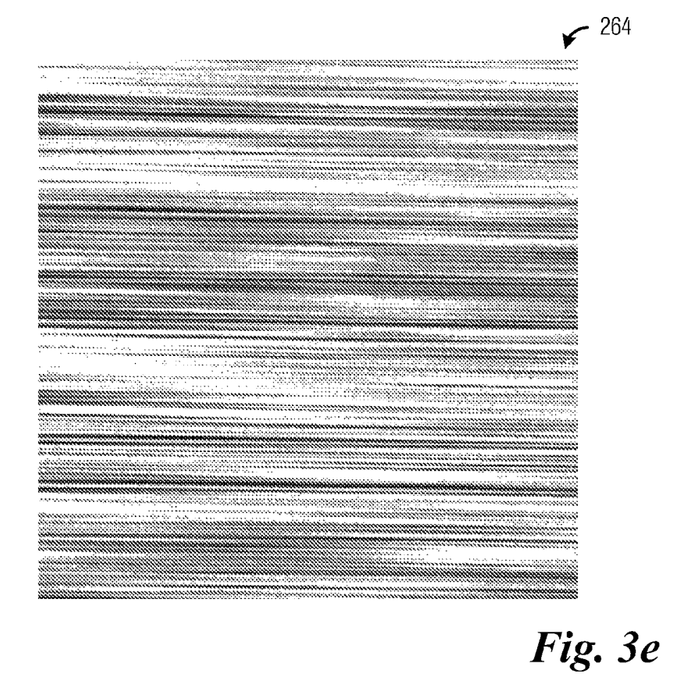

FIGS. 3d and 3e illustrate photomicrographs of surfaces of light shaping diffusers 264. The surface of the light shaping diffuser 264 shown in FIG. 3d is made up of structures having a random (or pseudorandom) orientation while the surface for the light shaping diffuser 264 shown in FIG. 3e is made up of structures having a generally parallel or horizontal orientation.

Figure 4A:
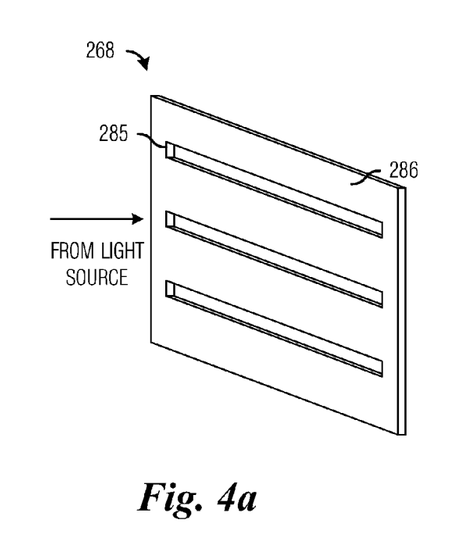
FIG. 4a is a diagram of an optical filter.

FIG. 4a illustrates a view of the optical filter 268. The optical filter 268 is shown having three slit apertures, such as slit aperture 285, formed in a body 286. Each slit aperture may be intended for use with a particular line of light, for example, the slit aperture 285 may be used to shape a line of red colored light. The slit aperture 285 is shown as having a rectangular shape, but the shape of a slit aperture may be dependent on factors such as a desired shape for the line of light, wavelength of the light, and so forth.

The body 286 of the optical filter 268 may be formed from an optically opaque material, such as a metallic material, an opaque glass or plastic, a non-opaque glass or plastic with an opaque coating on at least one surface, or so forth. The optical filter 268 may be formed by machining or by molding techniques.

Figure 4B:
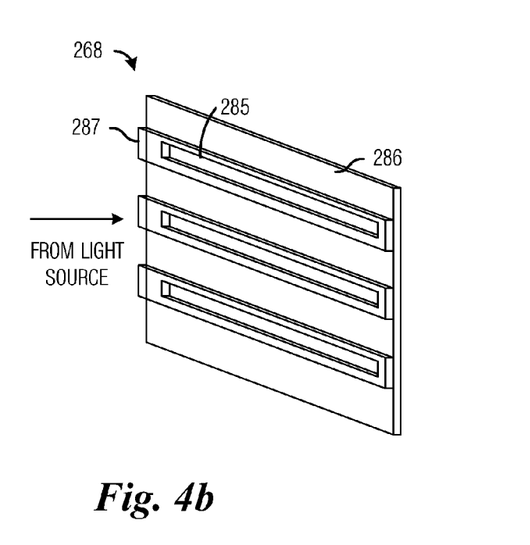
FIG. 4b is a diagram of an optical filter having color filters.

FIG. 4b illustrates a view of the optical filter 268. The optical filter 268 is shown having three slit apertures, such as slit aperture 285, and color filters, such as color filter 287, positioned in front of corresponding slit apertures, such as the slit aperture 285. Although shown in FIG. 4b to be positioned in front of the slit apertures, the color filters may be positioned in front of, behind, or inserted in the slit apertures of the optical filter 268.

The color filters, such as the color filter 287, may be formed by machining or molding the color filter from materials such as glass or plastic having desired optical wavelength filtering characteristics. Alternatively, the color filters may be created from materials not having the desired optical wavelength filtering characteristics and the desired optical wavelength filtering characteristics may be added by way of a coating, film, implant, and so forth. The color filters may be machined or molded in a separate step and then attached to the optical filter 268 using an adhesive, glue, heat, sound waves, or so on. Alternatively, the color filters may be formed from the same material as the body of the optical filter 268 and then a coating, film, implant, or so on, having desired optical wavelength filtering characteristics may be applied to the color filters.

Figures 5, 6:
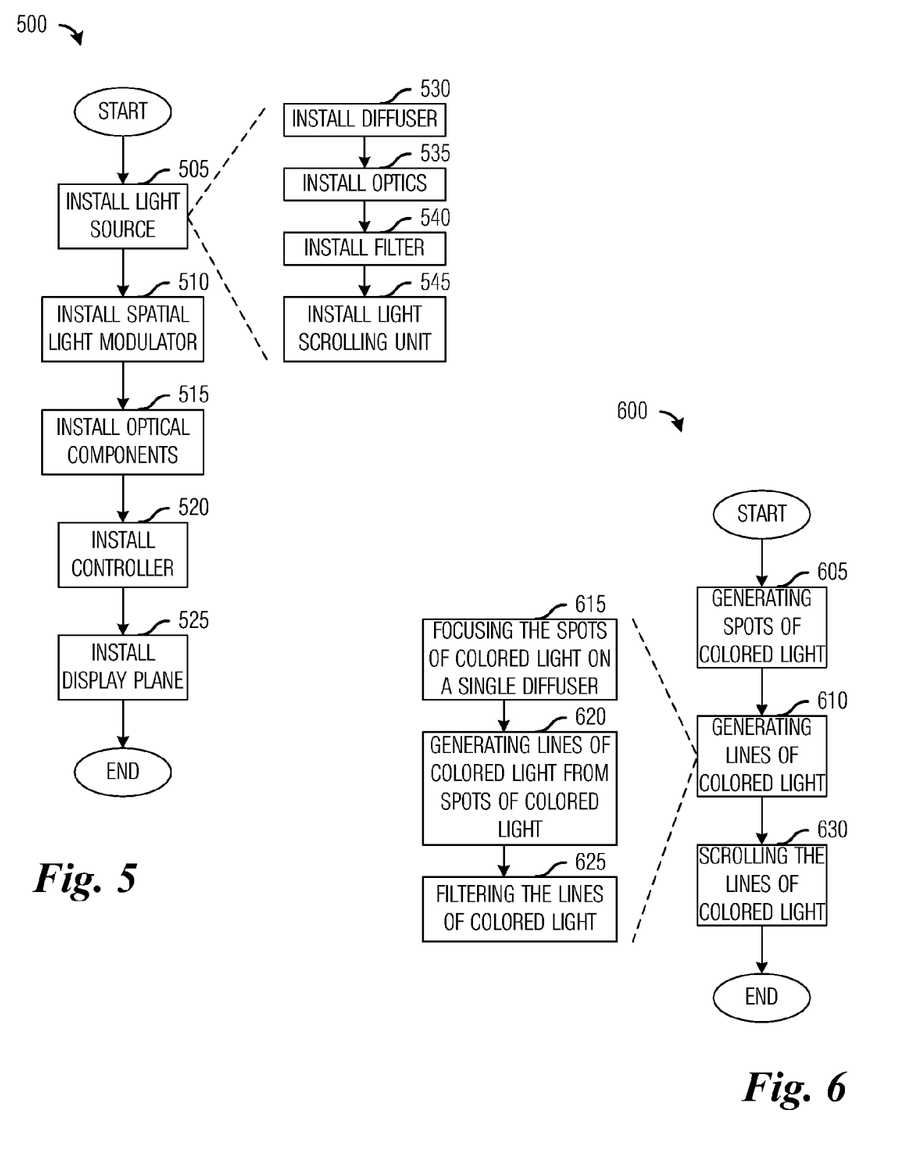
FIG. 5 is a diagram of a sequence of events in the manufacture of a projection display system.
FIG. 6 is a diagram of a sequence of events in the generating of lines of colored light.

FIG. 5 illustrates a sequence of events 500 in the manufacture of an exemplary microdisplay-based projection display system. The manufacture of the microdisplay-based projection display system may begin with installing a light source, which may produce multiple lines of colored of light (block 505). The installing of the light source may include the installing of a line generator unit such as a light diffuser to convert spots of light into lines of light (block 530). Also installed may an optics unit (block 535). The optics unit may include an optical filter to shape the lines of line as well as ensure that only desired colors of light exit the light source that may be installed (block 540) along with a light scrolling unit to scroll the lines of light over the surface of the microdisplay (block 545).

The manufacture may continue with installing a spatial light modulator such as a microdisplay, for example, a DMD, in the light path of the multiple colors of light produced by the light source (block 510). After installing the microdisplay, optical components such as a lens system may be installed in between the light source and the microdisplay (block 515). A controller for the microdisplay-based projection display system may then be installed (block 520). With the controller installed, the manufacture may continue with installing a display plane (block 525). The order of the events in this sequence may be changed, the sequence may be performed in a different order, or some of the steps may be performed at the same time to meet particular manufacturing requirements of the various embodiments of the DMD, for example.

FIG. 6 illustrates a sequence of events 600 in the generating of scrolling lines of colored light. The generating of scrolling lines of colored light may begin with generating of spots of colored light (block 605), such as from a light source having multiple laser light sources. From the spots of colored light, the lines of colored light may be generated (block 610).

The generating of the lines of colored light from the spots of colored light may include focusing the spots of colored light onto a surface of a single diffuser (block 615). The diffuser may be a light shaping diffuser of sufficient size to permit the simultaneous focusing of the spots of colored light. The light shaping diffuser may include an array of lenticular elements or a random or pseudorandom arrangement of structures that may be used to generate lines of colored light from the spots of colored light (block 620). The lines of colored light may then be filtered with an optical filter to provide a desired shape for the lines of light (block 625). The optical filter may also include color filters to help reduce or eliminate color contamination in the lines of colored light. The filtered lines of colored light may then be scrolled by a light scrolling unit (block 630).

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An illumination source comprising:
   a light source to produce colored light; and
   a scrolling optics unit optically coupled to the light source, the scrolling optics unit configured to create lines of colored light from the colored light, and to scroll the lines of colored light along a direction orthogonal to a light path of the illumination source, wherein the scrolling optics unit comprises,
   a single light shaping diffuser to transform the colored light into the lines of colored light, an optical filter positioned in the light path after the light shaping diffuser, the optical filter configured to shape the lines of colored light, and a scrolling optics element positioned in the light path after the optical filter, the scrolling optics element configured to move the lines of colored light in the direction orthogonal to the light path.

2. The illumination source of claim 1, wherein the scrolling optics element is selected from the group consisting of: a rotating reflective polygon, a rotating refractive polygon, a flower wheel, and combinations thereof.

3. The illumination source of claim 2 further comprising a motor coupled to the scrolling optics element, the motor configured to rotate the scrolling optics element.

4. The illumination source of claim 1, wherein the light source comprises:
 a set of coherent light sources, each coherent light source configured to produce colored light in a specified wavelength range; and
 a set of light collimators, each light collimator optically coupled to a coherent light source in the set of coherent light sources, the light collimator to substantially parallelize coherent light produced by a corresponding coherent light source.

5. The illumination source of claim 1, wherein the scrolling optics unit further comprises a speckle reduction optical element positioned in the light path, the speckle reduction optical element configured to reduce a visual impact of modulating spatial noise.

6. The illumination source of claim 1, wherein the light shaping diffuser is capable of substantially simultaneously transforming colored light from the light source into lines of colored light.

7. The illumination source of claim 6, wherein the light shaping diffuser comprises light diffusing structures oriented in a direction orthogonal to an orientation of the lines of colored light.

8. The illumination source of claim 7, wherein the light shaping diffuser comprises an array of lenticular elements, and wherein the array has a pitch substantially greater than a longest light wavelength produced by the light source.

9. The illumination source of claim 7, wherein the light shaping diffuser comprises randomly or pseudorandomly arranged structures having consistent orientation, and wherein each structure has a feature size substantially greater than a longest light wavelength produced by the light source.

10. The illumination source of claim 1, wherein the optical filter comprises an optically opaque body having multiple slit apertures, wherein the slit apertures shape a line of colored light passing through the slit aperture, wherein there is a slit aperture corresponding to each color of light produced by the light source.

11. The illumination source of claim 10, wherein the optical filter further comprises multiple color filters, wherein there is one color filter for each slit aperture, wherein each color filter blocks light wavelengths outside of an intended range of light wavelengths for a line of colored light passing through the slit aperture.

12. A method comprising:
 generating spots of colored light;
 focusing the spots of colored light on a single diffuser;
 generating lines of colored light from the spots of colored light;
 filtering the lines of colored light; and
 scrolling the filtered lines of colored light.

13. The method of claim 12, wherein the generating lines of colored light comprises passing the spots of colored light through a single reflective or refractive diffuser having an array of lenticular elements or a random or pseudorandom arrangement of structures.

14. The method of claim 12, wherein the filtering the lines of colored light comprises:
 shape filtering the lines of colored light to produce lines of desired shape; and
 color filtering the lines of colored light to reduce light contamination.

15. The method of claim 14, wherein the shape filtering and the color filtering are applied to each line in the lines of colored light individually.

16. A method of manufacturing a display system, the method comprising:
 installing a light source configured to generate coherent light, wherein the light source installing comprises
  installing a coherent light source to produce colored light,
  installing a light shaping diffuser in a light path of the coherent light source, the light shaping diffuser to substantially simultaneously transform the colored light into lines of colored light,
  installing a filter in the light path of the coherent light source, the filter to shape the lines of colored light, and
  installing a scrolling optics element in the light path of the coherent light source after the filter, the scrolling optics element to scroll the lines of colored light;
 installing a microdisplay in a light path of the display system after the light source;
 installing a controller configured to control the light source, the scrolling optics element, and the microdisplay; and
 installing a display plane in the light path of the display system after the microdisplay.

17. The method of claim 16, wherein the light shaping diffuser is manufactured by machining or molding.

18. The method of claim 16, wherein the light shaping diffuser comprises light diffusing structures and a body, wherein the light diffusing structures and the body are manufactured in separate manufacturing steps, and wherein the light diffusing structures are attached to the body using an adhesive or a glue.

19. The method of claim 16, wherein the light shaping diffuser is manufactured from a material selected from the group consisting of: glass, plastic, polymethylmethacrylate (PMMA), polycarbonate, polyester, mylar, acrylic, polymethyl-pentene, and combinations thereof.

20. The method of claim 16, wherein the filter comprises an optically opaque body having multiple slit apertures, and wherein the filter is manufactured by machining the multiple slit apertures in the optically opaque body.

21. The illumination source of claim 1, the scrolling optics unit configured to create spatially offset lines of colored light from the colored light.

22. The method of claim 12, wherein generating lines of colored light from the spots of colored light comprises generating spatially offset lines of colored light from the spots of colored light.

23. The method of claim 16, wherein installing a light shaping diffuser comprises installing a light shaping diffuser to transform the colored light into spatially offset lines of colored light.

* * * * *